US 8,720,284 B2

(12) United States Patent
Talikoti (10) Patent No.: US 8,720,284 B2
(45) Date of Patent: May 13, 2014

(54) PHOTOELECTRIC POWERED WIRELESS SENSOR UNIT

(75) Inventor: Vijay Tippanna Talikoti, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 308 days.

(21) Appl. No.: 13/343,434

(22) Filed: Jan. 4, 2012

(65) Prior Publication Data

US 2013/0167662 A1 Jul. 4, 2013

(51) Int. Cl.
*G01L 3/02* (2006.01)

(52) U.S. Cl.
USPC .................................................. 73/862.324

(58) Field of Classification Search
USPC ......... 73/862.08, 862.324, 862.325, 862.326, 73/862.338
See application file for complete search history.

(56) References Cited

U.S. PATENT DOCUMENTS

| | | | |
|---|---|---|---|
| 3,619,612 A | 11/1971 | Belke et al. | |
| 5,757,478 A * | 5/1998 | Ma | 356/141.2 |
| 5,918,286 A * | 6/1999 | Smith et al. | 73/862.324 |
| 6,513,394 B1 | 2/2003 | Gutjahr et al. | |
| 6,948,381 B1 * | 9/2005 | Discenzo | 73/862.324 |
| 7,307,517 B2 | 12/2007 | Liu et al. | |
| 7,697,127 B2 * | 4/2010 | Vogel et al. | 356/154 |
| 7,742,160 B2 * | 6/2010 | Bottini et al. | 356/141.1 |
| 7,812,940 B2 * | 10/2010 | Daigle | 356/138 |
| 2010/0292954 A1 * | 11/2010 | Lin | 702/151 |

* cited by examiner

*Primary Examiner* — Max Noori
(74) *Attorney, Agent, or Firm* — Craige Thompson; Thompson Patent Law Offices (57) ABSTRACT

This disclosure is directed to techniques for detecting one or more indications of rotational movement of a rotatable member. According to one example, at least one movement sensor is associated with the rotatable member and is configured to detect at least one measurement of rotational motion of the rotatable member. The at least one movement sensor is configured to be powered via at least one photoelectric element secured to the rotatable member. The at least one movement sensor is configured to communicate the at least one indication of the detected at least one measurement from the rotatable member via at least one wireless communications module associated with the rotatable member and powered via the at least one photoelectric element.

20 Claims, 4 Drawing Sheets

PHOTOELECTRIC POWERED WIRELESS SENSOR UNIT

TECHNICAL FIELD

The disclosure relates generally to sensor circuits and, more specifically, to sensors for measuring one or more properties related to rotation of a member, such as a cylinder, or other object.

BACKGROUND

In some examples, one or more sensors may be secured to a rotating member, such as a rotating member (e.g., a cylinder) of industrial equipment, to measure one or more properties related to the rotation of the rotatable member. For example, such one or more sensors may comprise one or more strain gauges configured to detect one or more properties related to rotational movement based on deformation of the one or more strain gauges.

SUMMARY

This disclosure is directed to techniques for powering one or more rotational movement sensors. According to the techniques of this disclosure, at least one rotational movement sensor may be associated with a rotatable member, such as a cylindrical shaft configured to rotate. The at least one movement sensor may be configured to detect at least one measurement of rotational motion of the rotatable member. For example, the at least one movement sensor may detect a measurement of torque of a cylindrical shaft. The at least one movement sensor may be configured to be powered via at least one photoelectric element, such as a solar panel, secured to the rotatable member. The at least one photoelectric element may receive electromagnetic energy (e.g., optical energy) from at least one light source, such as a light emitting diode (LED) separate from the rotational movement sensor. The at least one movement sensor may communicate at least one indication of the detected at least one measurement from the rotatable member via at least one wireless communications module associated with the rotatable member and powered via the at least one photoelectric element.

In one example, a device is described herein. The device includes at least one movement sensor associated with a rotatable member. The at least one movement sensor is configured to detect at least one measurement of rotational motion of the rotatable member. The at least one movement sensor is configured to be powered via at least one photoelectric element secured to the rotatable member, and the at least one movement sensor is configured to communicate at least one indication of the detected at least one measurement from the rotatable member via at least one wireless communications module associated with the rotatable member and powered via the at least one photoelectric element.

In another example, a method is described herein. The method includes powering, via at least one photoelectric element secured to a rotatable member, at least one movement sensor associated with a rotatable member to detect at least one measurement of rotational motion of the rotatable member. The method further includes powering, via the at least one photoelectric element, at least one wireless communications module associated with the rotatable member to communicate at least one indication of the detected at least one measurement from the rotatable member.

In another example, a device is described herein. The device includes means for powering, via at least one photoelectric element secured to a rotatable member, at least one movement sensor associated with a rotatable member to detect at least one measurement of rotational motion of the rotatable member. The device further includes means for powering, via the at least one photoelectric element, at least one wireless communications module associated with the rotatable member to communicate at least one indication of the detected at least one measurement from the rotatable member.

The details of one or more embodiments of the invention are set forth in the accompanying drawings and the description below. Other features, objects, and advantages of the invention will be apparent from the description and drawings, and from the claims.

DETAILED DESCRIPTION

Measurement of various properties of rotating objects may be useful in a variety of commercial, industrial and/or automotive applications. A motor or other device may apply a force to rotate a member, such as an axle, rotating cylinder, or another object. It may be desirable to measure one or more of properties of such rotational movement to, for example, determine whether one or more systems or devices that include such a member are operating as desired and/or as expected. In some examples, the one or more properties of rotational movement may include the torque of a rotatable member.

As a result of the force that the motor applies to the rotatable member, the rotatable member may be subject to strains, such as axial strain, bending strain, and various other forces related to rotation, such as rotational force, torque, angular momentum, rotational velocity (or rotational speed), and rotational acceleration. As stated above, it may be desirable to measure these forces to ensure proper operation of the rotatable member.

According to the techniques described herein, one or more sensors may be secured to a rotatable member, such as a rotatable cylinder, and used to measure one or more properties relating to rotational movement of the rotatable member. For example, such sensors may include one or more gyroscope, accelerometer, strain gauge, and/or any other type of sensor capable of measuring one or more properties related to movement of the rotatable member. In some examples, the one or more sensors may be secured directly to the rotating member in order to measure the desired properties. As one example, an adhesive wrapping and/or other mechanism may be used to secure the one or more sensors to the rotatable member. The adhesive wrapping may hold the sensors in contact with the rotating member. In some examples, the adhesive wrapping may allow the sensors to be removed and re-attached to the same or a different rotating member. Thus, permanent or semi-permanent sensors need not be used in conjunction with measuring one or more properties of rotational movement of a rotatable member.

Generally speaking, one or more movement sensors, such as strain gauges, gyroscopes, and/or accelerometers may require a power source for operation. Once powered, the sensors may be configured to detect one or more indications of movement, such as rotational movement of the rotatable member. In some examples, such sensors may be coupled to one or more components configured to transmit one or more indications of detected measurements to another device, such as a computing device. Such a computing device may enable a user to monitor the movement of the rotatable member.

In some examples, some mechanisms for transferring power to electrical equipment, such as wired connections, may not be well suited for powering one or more sensors secured to a rotating member. This disclosure is directed to techniques for powering one or more sensors secured to a rotatable member, as well as one or more components coupled to the one or more sensors. According to the techniques described herein, one or more photoelectric elements may be secured to an exterior surface of the rotatable member. In some examples, the photoelectric elements may comprise one or more solar panels. The one or more photoelectric elements may be configured to receive power from one or more light sources (e.g., one or more LEDs) external to (e.g., apart from) the rotatable member, and provide a power supply to the one or more sensors. The one or more sensors may be coupled to at least one communications module secured to the rotatable member. The at least one communications module may also be powered via the one or more photoelectric elements.

The techniques of this disclosure may provide advantages compared to other techniques for powering at least one sensor secured to a rotatable member and configured to detect at least one indication of rotational movement of the rotatable member. For example, according to the techniques described herein, the one or more sensors may be removeably secured to a rotating member, while requiring less accurate alignment in comparison to other techniques. For example, the one or more photoelectric elements (e.g. solar panels) and/or the one or more light sources external to the rotatable member may not require stringent alignment in comparison to other techniques for powering sensors secured to a rotatable member, such as using RF telemetry to power sensors secured to a rotatable member.

Figure 1:
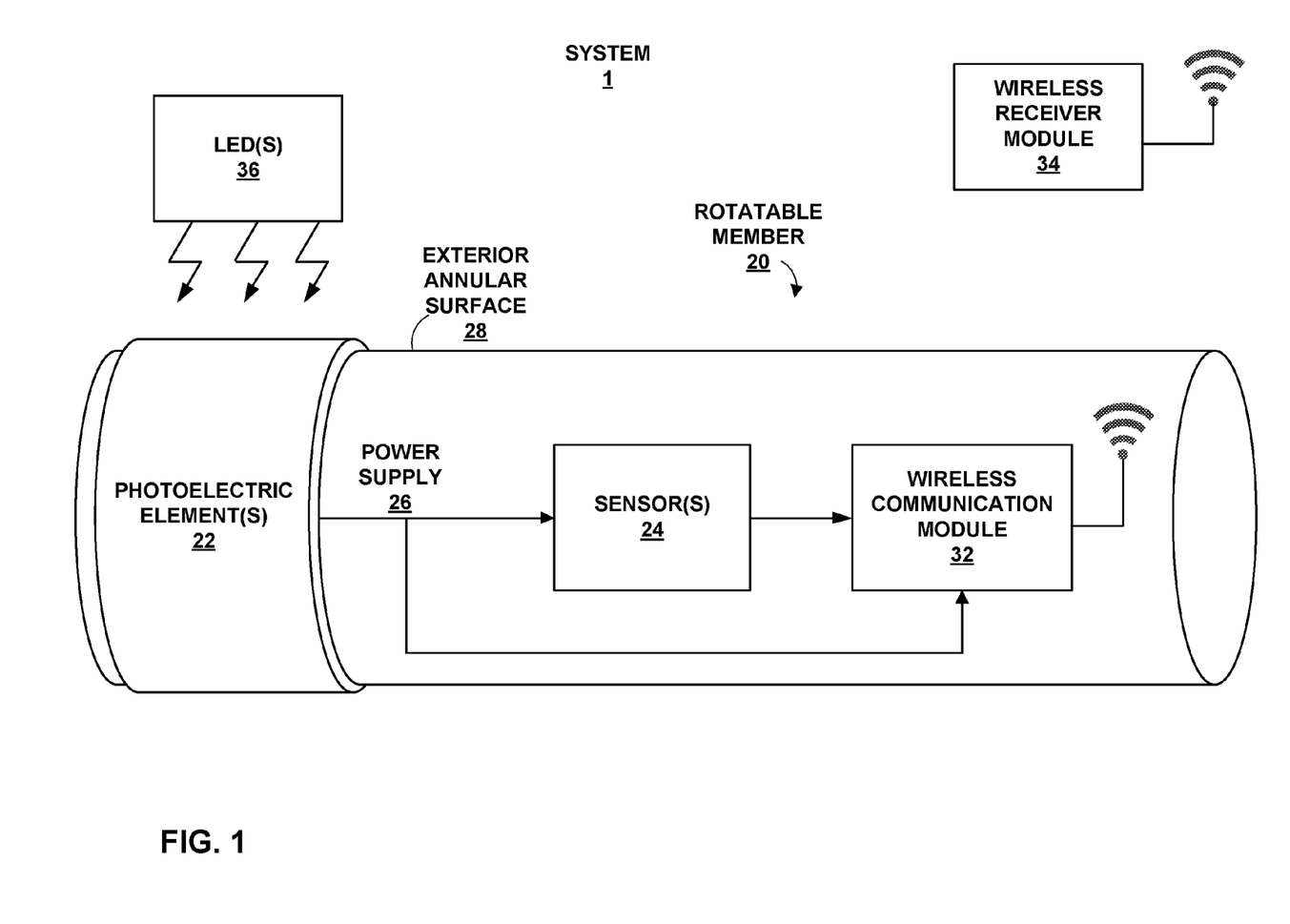
FIG. 1 is a conceptual diagram that illustrates one example of a system that includes one or more movement sensors secured to a rotatable member to detect at least one indication of rotational movement of the rotatable member consistent with one or more aspects of this disclosure.

FIG. 1 is a conceptual diagram that illustrates one example of a system 1 that includes one or more movement sensors 24 secured to a rotatable member 20 to detect at least one indication of rotational movement of the rotatable member 20 consistent with one or more aspects of this disclosure.

As depicted in FIG. 1, system 1 includes a rotatable member 20, one or more photoelectric elements 22, one or more sensors 24, and at least one wireless communication module 32. In some examples, photoelectric elements 22, sensors 24, and wireless communication module 32 may be mounted on or in rotatable member 20. As also shown in FIG. 1, system 1 also includes at least one light-emitting diode (LED) 36, as well as at least one wireless receiver module 34, which are external to (e.g., apart from) rotatable member 20. In some examples, the at least one LED 36 and/or the wireless receiver module 34 may be attached to or comprise part of a stator, or stationary member.

System 1 depicted in FIG. 1 may be configured to detect one or more properties relating to rotation of rotatable member 20, and generate one or more output signals that indicate the one or detected properties. As stated above, sensors 24 may require power to detect one or more measurements related to the rotation of rotatable member 20. In the example of FIG. 1, one or more LEDs emit light in a direction of photoelectric elements 22. Photoelectric elements 22 (e.g., solar panels) may convert received light into electricity. Electrical power output from photoelectric elements 22 may be electrically coupled to power one or more sensors 24, as well as other components that may require power for operation, such as wireless communication module 32 and/or any other component coupled to the one or more sensors 24.

Photoelectric elements 22 may be secured to an exterior surface of rotatable member 20. For example, wherein rotatable member is a cylinder as shown in FIG. 1, photoelectric elements 22 may be secured to an exterior annular surface of rotatable member 20. In some examples, photoelectric elements 22 may be arranged substantially contiguously on an annular surface of a rotating member, such as the exterior annular surface 28 of rotatable member 20, which may comprise a cylinder as shown in the example of FIG. 1.

Photoelectric elements 22 and LEDs 36 may be arranged, with respect to one another, such that photoelectric elements 22 may receive optical energy in the form of light from LEDs 36, and convert the received optical energy into electrical energy for use by one or more components of system 1, such as sensors 24 and/or communications module 32. In some examples, an arrangement of photoelectric elements 22 secured to an exterior surface of rotatable member 20 (e.g., an exterior annular surface 28 shown in FIG. 1), as well as an arrangement of corresponding LEDs 36 with respect to photoelectric elements 22, may allow rotatable member 20 to rotate along with photoelectric elements 22, while being powered via LEDs 36 and photoelectric elements 22.

In some examples, photoelectric elements 22 and LEDs 36 may be chosen in such a way that the spectrum of light emitted from LEDs 36 is within a normal range of light that photoelectric elements 22 may operate in to produce a power supply for one or more components of system 1. Although rotatable member 20 is depicted as a cylinder in FIG. 1, in other examples, sensors 24, photoelectric elements 22, and/or wireless communication module 32 may be secured to a rotating member of any shape, which may not necessarily be cylindrical in shape. As examples, rotating member 20 may comprise a spherical, octagonal, or triangular shape, or any other shape.

In the example depicted in FIG. 1, measurements detected via sensors 24 may be transmitted to one or more external computing devices that monitor detected measurements. Again, sensors 24 may be configured to detect one or measurements of rotational movement, such as rotational force, torque, angular momentum, rotational velocity, and rotational acceleration of rotatable member 20. In some examples, the sensors may comprise strain gauges, accelerometers, and/or gyroscopes and may be configured to detect one or more properties related to rotation of a member, such as a cylinder, or other object.

According to the example of FIG. 1, to transmit the measurements from sensors 24, the output from sensors 24 may be coupled to wireless communication module 32, which may send the measurements to wireless receiver module 34. According to the techniques described herein, wireless communication module 32 may receive power to operate from photoelectric elements 22. Wireless communication module 32 may, for example, comprise a wireless integrated circuit (IC) component that operates at least in part according to one of the Institute for Electrical and Electronics Engineers (IEEE) 802.11 Wi-Fi™ communication standards, such as 802.11a, b, g, and/or n, Bluetooth®, or another wireless communications protocol.

Wireless communication module 32 may receive output measurements from sensors 24, and transmit data about the output measurements to wireless receiver module 34. Wireless communication module 32 may convert the data from sensors 24 into a format compatible with the one or more wireless protocols used to send data between wireless communication module 32 and wireless receiver module 34. In some examples, as part of the one or more wireless communication protocols that wireless communication module 32 may be compatible with, wireless communication module 32 may also send and receive data from wireless receiver module 34, as well as other wireless devices.

Wireless receiver module 34 may send and receive data related to the measurements of sensors 24. Wireless receiver module 34 may be connected to one or more computing devices, such as a desktop, laptop, or tablet computer, server, or other computing device that may monitor the measurements received from sensors 24. In some examples, such a computing device may be configured to compare one or more indications of detected measurements to one or more predetermined or adaptively determined thresholds. In some examples, the computing device may notify a user of a problem or take another action in response to such a comparison.

In some examples, when rotatable member is rotating, it may not be feasible to use a wired electrical connection to power components of system 1 and/or transmit data to and from rotatable member 20. According to the techniques described herein, instead of such a wired electrical connection, system 1 may utilize photoelectric elements 22 and LEDs 36 to wirelessly transmit power to sensors 24 and/or communications module 32, which may thereby improve the usability of system 1 to measure one or more properties related to the rotational movement of rotatable member 20.

In some examples consistent with the techniques described herein, sensors 24 may be removeably secured to a rotating member, while requiring less accurate alignment in comparison to other techniques. For example, photoelectric elements 22 and/or the LEDs 36 external to rotatable member 20 may not require stringent alignment in comparison to other techniques for powering sensors secured to a rotatable member, such as using RF telemetry to power sensors secured to a rotatable member.

Figure 2:
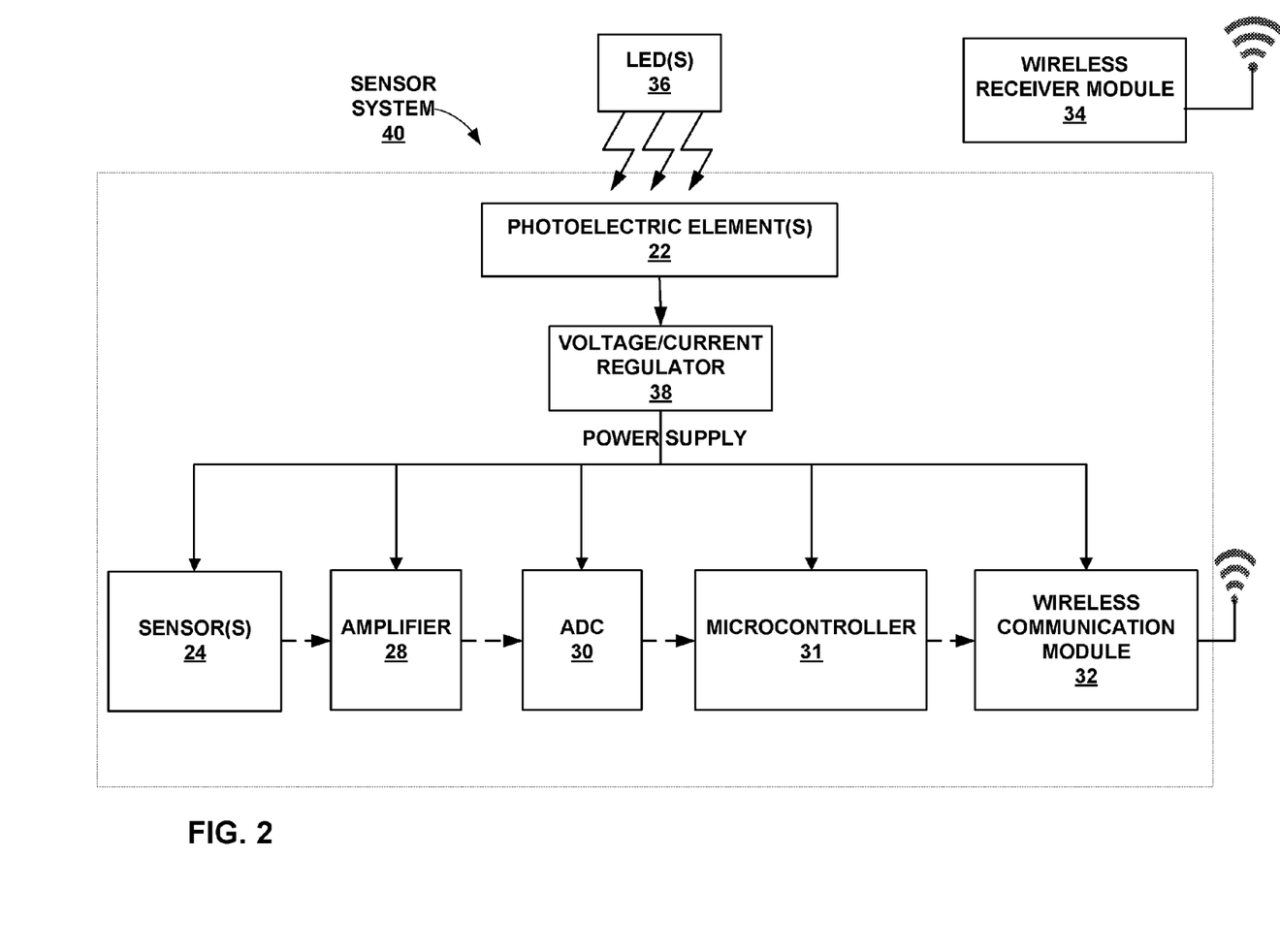
FIG. 2 is a block diagram illustrating an example of a photoelectric powered wireless sensor unit consistent with one or more aspects of this disclosure.

FIG. 2 is a block diagram illustrating one example of a photoelectric powered (e.g. solar panel powered) wireless sensor system 40 consistent with one or more aspects of this disclosure. As shown according to the example of FIG. 2, sensor system 40 includes photoelectric elements 22, sensors 24, amplifier 28, ADC 30, microcontroller 31, and wireless communication module 32. FIG. 2 depicts the flow of power from LEDs 36 to sensor system 40 and within sensor system 40, as well as the flow of data within sensor system 40. For example, as shown in FIG. 2, the solid line arrows represent the supply of power from photoelectric elements 22 to sensors 24, amplifier 28, ADC 30, microcontroller 31, and wireless communication module 32. As also shown in FIG. 2, the dashed line arrows represent data generated by sensors 24.

As depicted in FIG. 2, one or more components of sensor system 40, such as the one or more of photoelectric elements 22, sensors 24, amplifier 28, ADC 30, microcontroller 31, wireless communication module 32, and voltage/current regulator 38, may be mounted in or on rotatable member 20 depicted in FIG. 1. As also shown in FIG. 2, one or more other components of sensor system 40 such as LEDs 36 and wireless receiver module 34, may be arranged apart from rotatable member.

In some examples, LEDs 36 may produce optically transmitted energy (e.g., light) in response to an electric current. Photoelectric elements 22 may receive light emitted from LEDs 36, and convert the received light into electrical energy.

Figure 3:
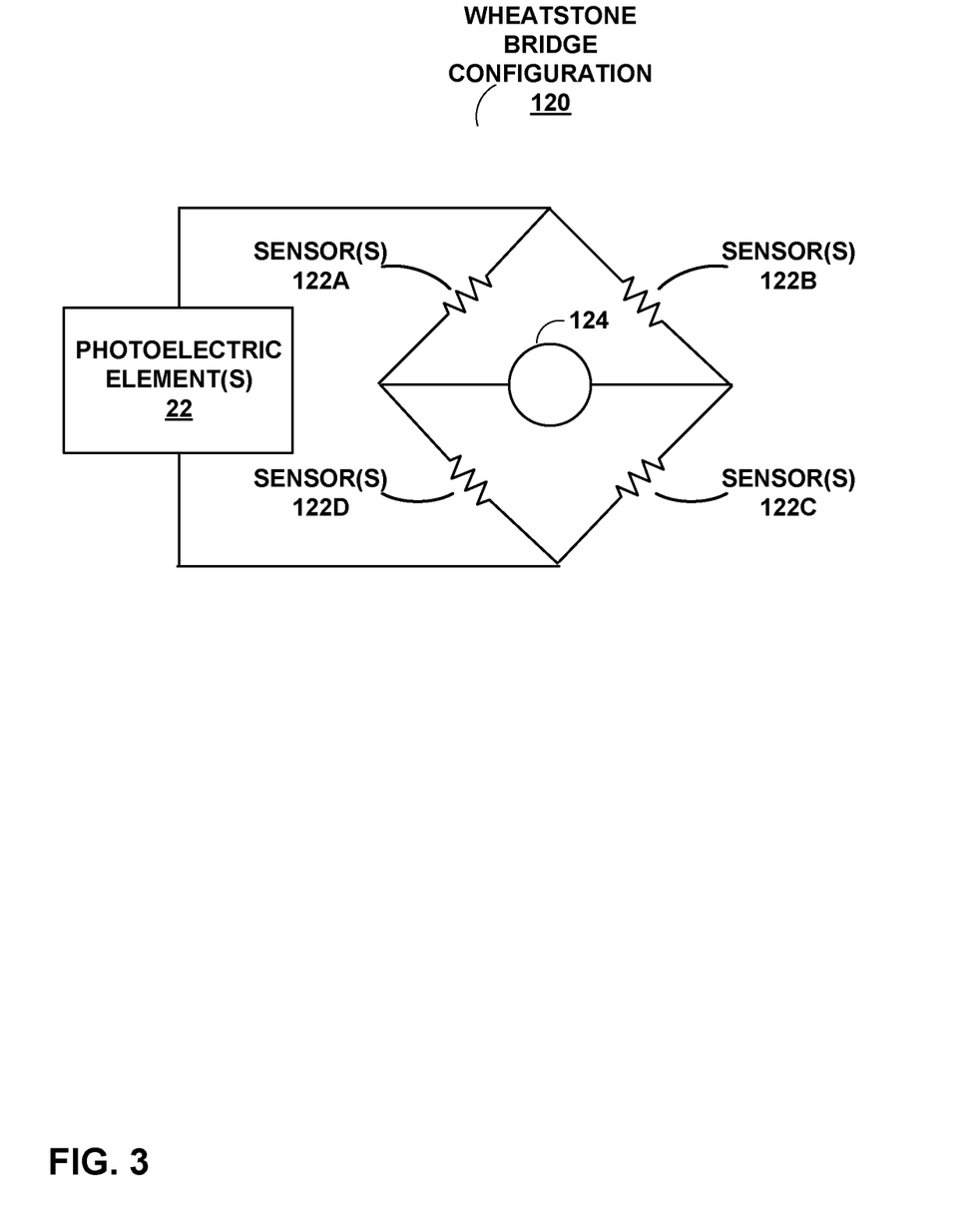
FIG. 3 is a conceptual diagram illustrating a sample circuit layout of a Wheatstone Bridge circuit that may be used to measure one or more properties associated with rotation of a rotatable member consistent with one or more aspects of this disclosure.

As shown in FIG. 2, sensor system 40 also includes a voltage and/or current regulator 38. In some examples, voltage/current regulator 38 may regulate power received from photoelectric elements 22 by stabilizing an output voltage and/or current of received power. For example, when one or more of components 24, 28, 30, 31, and 32 are configured to operate according to a five volt supply, voltage/current regulator 38 may regulate a voltage of power received from photoelectric elements 22 to have a substantially constant voltage of five volts. According to the example of FIG. 2, sensors 24, which may comprise movement sensors, may output one or more indications of detected measurement of rotational motion to amplifier 28. In some examples, sensors 24 may be arranged as a Wheatstone bridge circuit, one example of which is depicted in FIG. 3. A Wheatstone bridge may be described an electrical circuit that may be used to measure an unknown resistance or voltage. According to these examples, a Wheatstone bridge may include four legs, and a voltage difference detected between two nodes of the Wheatstone bridge may be indicative of a resistance of one or more of the legs.

According to some aspects of this disclosure, sensors 24 may be arranged as one or more of legs of a Wheatstone bridge. According to these examples, in response to measuring one or more properties of rotational motion of rotatable member 20, one or more of sensors 24 may produce one or more electrical signals. The one or more signals may in turn cause a voltage difference across two or more nodes of the Wheatstone bridge. According to these examples, an output signal of the Wheatstone bridge may indicate the measured one or more properties of rotational motion of the rotatable member 20.

As also shown in FIG. 2, sensor system 40 also includes an amplifier 28 and an analog to digital converter (ADC) 30. In some examples, amplifier 28 may comprise a single ended amplifier. In other examples, amplifier 28 may comprise a differential amplifier. Amplifier 28 may receive one or more analog signals generated by sensors 24, and amplify a voltage and/or current of the received signal (e.g., the output of a Wheatstone bride circuit comprising sensors 24). Amplifier 28 may provide such one or more amplified analog signals to ADC 30. ADC 30 may generate one or more digital signals that represent the received one or more amplified analog signals, and may supply such signals to wireless communication module 32 and/or microcontroller 31.

Microcontroller 31 may receive one or more signals from ADC 30 and may convert the signals received from ADC 30 to a data format compatible with wireless data transmission by wireless communication module 32. As an example, microcontroller 31 may convert the received signals into a pulse train that wireless communication module 32 may interpret and convert into a format for wireless communications, such as by packetizing data representing the received signals. Microcontroller 31 may also output one or more signals to wireless communication module 32 that may control or configure the operation of wireless communication module 32. As an example, microcontroller 31 may control a transmit signal that may indicate to wireless communication module 32 when wireless communication module 32 may send data, or when not to send data (e.g., to conserve power).

In another example, microcontroller 31 may supply signals that cause wireless communication module 32 to re-transmit data in the event of a transmission error or data loss.

Wireless communication module 32 may process the one or more received digital signals for data transmission, and output the processed digital data to wireless receiver module 34. For example, wireless communication module 32 may transmit the digital input received from ADC 30, packetize the data, and/or transmit the data using a wireless connection. In some examples, wireless communication module 32 may be connected to one or more antennae which may boost the strength of the transmitted signal. Wireless communication module 32 may be a component such as one or more IC that transmits data wirelessly according to one of the IEEE 802.11a/b/g/n wireless standards (also referred to as "Wi-Fi®"). Although generally described herein as operating according to one or more of the 802.11a,b,g, and/or n standards, wireless communication module 32 may operate according to one or more different wireless communication protocols and/or standards.

As shown in FIG. 2, wireless receiver module 34 may receive wireless data transmitted by wireless communication module 32. For example, wireless received module 34 may be electrically coupled to one or more antennae for receiving the data for receiving wireless data transmitted by wireless communication module 32. In some examples, in addition to receiving data, wireless receiver module 34 may also transmit data to wireless communication module 32. For example, in an environment with significant interference, data transmitted from wireless communication module 32 may not be received correctly by wireless receiver module 34. Wireless receiver module may recognize this loss of data and send a signal to wireless communication module 32 requesting retransmission of data in accordance with one or more wireless protocols and/or standards.

Upon successful reception of data from wireless communication module 32, wireless receiver module 34 may convert the received data to a form that a monitoring computing system, such as a tablet, PC, laptop, cellular phone, e-reader, terminal, mainframe, microcontroller, or another similar computing device may interpret. Wireless receiver module 34 may convert the wireless signal received and transmit it over a wired network, such as an Ethernet network or another similar wireless network. Wireless receiver module 34 may also interface with one or more monitoring systems, which may monitor that the one or more monitored properties of rotatable member 20 are within a desired range or value, and alert one or more users in response to the measured properties being outside the desired range or value.

All of the components illustrated inside sensor system 40 depicted in FIG. 2, including photoelectric elements 22, sensors 24, amplifier 28, ADC 30, microcontroller 31, wireless communication module 32, and voltage/current regulator 38, may be located in a variety of positions secured to rotatable member 20. For example, each of components 22, 24, 28, 30, 31 32, and 38 may be mounted on an exterior surface of the rotating member, on an interior surface of the rotating member, inside of the rotating member, or a combination thereof. In some examples, or more of the components 22, 24, 28, 30, 31, 32, and 38 of sensor system 40 may be secured to rotatable member via being mounted at least partially on top of another of components 22, 24, 28, 30, 31, 32, and 38. For example, photoelectric elements 22 may be mounted at least partially on top of voltage/current regulator 38, which in turn may be secured to an interior or exterior surface of rotatable member 20.

In some examples, one or more of photoelectric elements 22, voltage/current regulator 38, sensors 24, amplifier 28, ADC 30, microcontroller 31, and wireless communication module 32 may be located on an exterior surface of a rotating member, such as rotatable member 20 of FIG. 1. For example, where the rotatable member comprises a cylinder as shown in the example of FIG. 1, one or more of photoelectric elements 22, voltage/current regulator 38, sensors 24, amplifier 28, ADC 30, microcontroller 31, and wireless communication module 38 may be arranged on a longitudinal, or exterior annular surface, of the rotatable member 20. According to some examples, arranging the components on such an exterior annular surface of rotatable member 20, may enable sensor system 40 to detect one or more measurements of rotational movement, without interfering with other components coupled to the rotatable member, such as one or more motors or other device configured to cause rotational movement of the rotatable member 20.

FIG. 3 is a conceptual diagram illustrating a sample circuit layout of a Wheatstone bridge 120 comprising one or more rotational movement sensors consistent with one or more aspects of this disclosure. A Wheatstone bridge is an electrical circuit that may be used to measure an unknown resistance. In some examples, a Wheatstone bridge may have four legs, each of which may comprise one or more sensors. For example, as shown in FIG. 3, sensors 122A, 122B, 122C, and 122D (collectively referred to as "sensors 122") each comprise a leg of Wheatstone bridge circuit. In some examples, a voltage difference measured across the bridge, such as at point 124 may indicate the resistance change of one or more of the legs of the Wheatstone bridge 120. In some examples, according to some aspects of this disclosure, photoelectric elements 22 and/or voltage/current regulator 28 depicted in FIG. 2 may power sensors 122 via an electrical coupling. Additionally, as stated above, photoelectric elements 22 may comprise solar panels.

According to the example of FIG. 3, each of sensors 122 a resistance of one or more of sensors 24 may change in response to detecting one or more properties of rotational movement of rotatable member 20. The change in resistance of each of sensors 122 may be proportional, for example linearly proportional, to motion of rotatable member 20 experienced by one or more of sensors 122. In some examples, a non-zero change in measured resistance for one or more of sensors 122, may indicate (e.g., an a portion of an analog signal) at least one measurement of rotational movement of rotatable member 20. In some examples, if no change in measured resistance for one or more of sensors 122 may indicate that rotatable member 20 is in a steady state.

The example of FIG. 3 depicts sensors 122 arranged as a full Wheatstone bridge circuit 120. In other examples, sensors 122 may be arranged as a "half," or "quarter" Wheatstone bride circuit. A half Wheatstone bride circuit may includes sensors at two legs of the bridge. A quarter Wheatstone bride circuit may include a sensor at one leg of the bridge. According to these examples, each leg of a Wheatstone bridge that does not include a sensor 122 may include a resistor or a "dummy" sensor that closely matches the resistance of a sensor. By matching the resistance of the sensor, the voltage 124 across the bridge may be zero under steady state conditions, and indicate one or more detected measurements of rotational movement if rotatable member 20 is not in a steady state.

In some cases, sensors 122 may comprise accelerometers, gyroscopes and/or strain gauges. In the case where sensors 122 include at least one strain gauge, the strain gauges may also be one of several configurations. In some examples, strain gauges may comprise dual or double strain gauges, wherein each strain gauge is capable of measuring strain in two separate directions and produces two separate resistances proportional to the strain.

In some examples sensors 122 may be secured to a rotatable in various orientations with respect to the rotatable member. For example, sensors 122 may be oriented at a forty-five degree angle relative to each of the four cardinal directions (that is, the sensors may be positioned northwest, northeast, southeast, and southwest) relative to the longitudinal axis of the rotating member. As another examples, sensors may also be positioned anywhere along the circumference of the rotatable member and/or along the longitudinal axis of the rotatable member.

Figure 4:
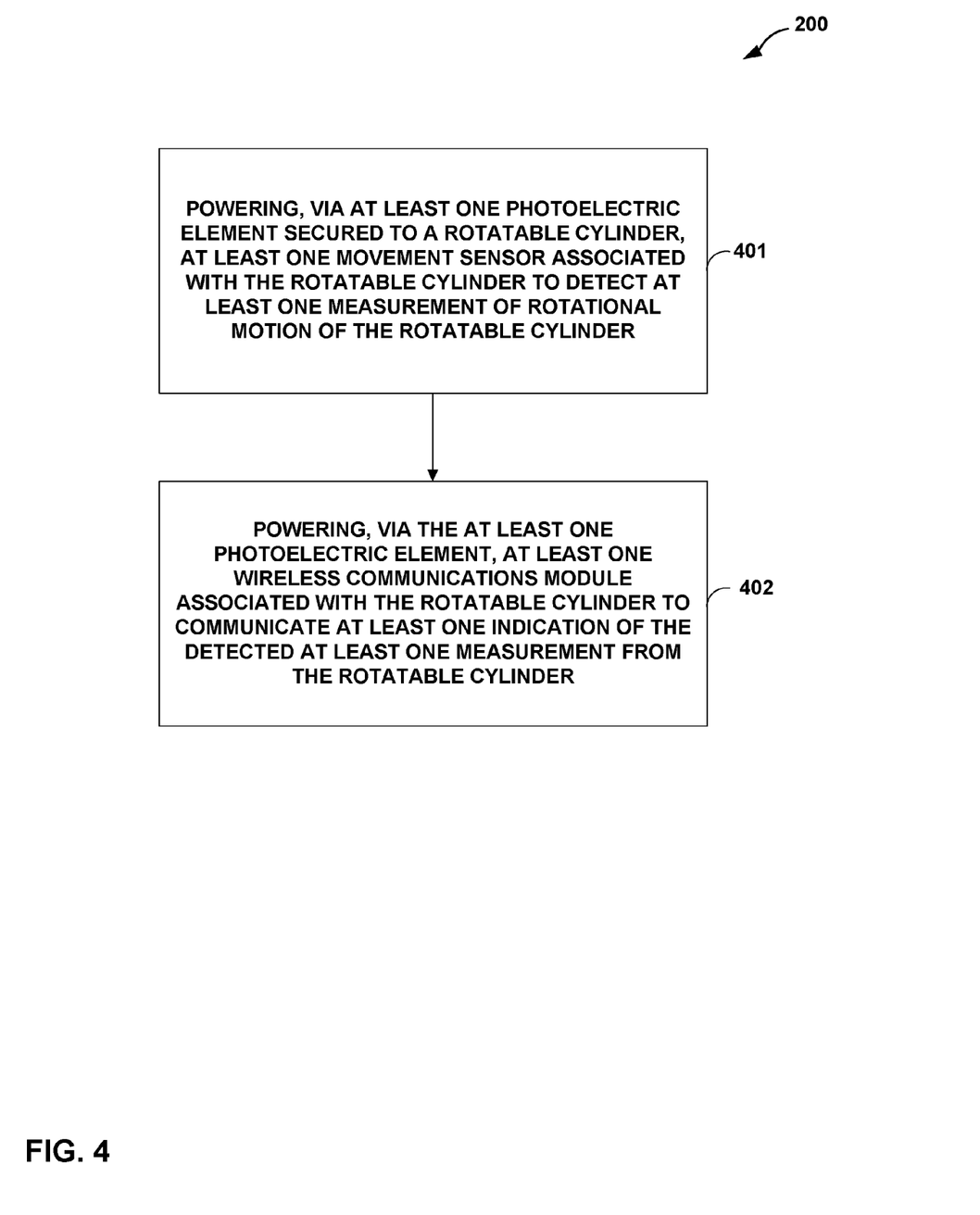
FIG. 4 is a flowchart that illustrates one example of a method of operating a rotational motion sensor consistent with one or more aspects of this disclosure.

FIG. 4 is a flowchart that illustrates one example of a method 200 of operating a rotational movement sensor consistent with one or more aspects of this disclosure. The method of FIG. 4 is described as being performed by components of sensor system 1 depicted in FIG. 1. However, any other system or device may be used to perform the method depicted in FIG. 4.

As depicted in FIG. 4, at least one photoelectric element 22 secured to a rotatable member powers at least one movement sensor 24 associated with the rotatable member 20 (401). The at least one movement sensor may be configured to detect at least one measurement of rotational motion of the rotatable member 20.

The at least one photoelectric element 22 may also power at least one wireless communications module associated with rotatable member 20, and the at least one wireless communication module may be configured to communicate the at least one indication of the detected at least one measurement from the rotatable member (402). The rotatable member 20 may have an exterior surface. In some examples, the at least one photoelectric element 22 may be secured to an exterior surface 26 of the rotatable member 20. In some examples, the exterior surface of rotatable member 20 may comprise an exterior annular surface. In some examples, the at least one photoelectric element 22 may be secured to an exterior annular surface 26 of rotatable member 20. In some examples, the at least one photoelectric element 22 may be secured substantially contiguous to the exterior annular surface of rotatable member 20. For example, the at least one photoelectric elements 22 may be arranged to be substantially contiguous with an annular contour of the annular exterior surface of the rotatable member. In some examples, rotatable member 20 may be a cylinder. In some examples, the at least one photoelectric element may be secured substantially contiguous to a longitudinal surface of the rotatable member 20.

Various embodiments of the invention have been described. These and other embodiments are within the scope of the following claims.

What is claimed is:

1. A device comprising:
    at least one movement sensor associated with a rotatable member and configured to detect at least one measurement of rotational motion of the rotatable member, wherein the at least one movement sensor is configured to be powered via at least one photoelectric element secured to the rotatable member; and
    wherein the at least one movement sensor is configured to communicate at least one indication of the detected at least one measurement from the rotatable member via at least one wireless communications module associated with the rotatable member and powered via the at least one photoelectric element.

2. The device of claim 1, wherein the at least one movement sensor comprises a plurality of strain gauge sensors secured to the rotatable member and arranged to detect the at least one measurement of rotational motion of the rotatable member.

3. The device of claim, 2, wherein the plurality of strain gauge sensors are arranged to detect one or more measurements of rotational motion of the rotatable member selected from a group consisting of:
    rotational force;
    torque, angular momentum;
    rotational velocity; and
    rotational acceleration.

4. The device of claim 1, wherein the at least one photoelectric element is secured to an exterior surface of the rotatable member.

5. The device of claim 4, wherein the at least one photoelectric element is secured to an exterior annular surface of the rotatable member.

6. The device of claim 5, wherein the one or more photoelectric elements are arranged substantially contiguous to a circumference of the annular exterior surface of the rotatable member.

7. The device of claim 6, wherein the one or more photoelectric elements are arranged to be substantially contiguous with an annular contour of the annular exterior surface of the rotatable member.

8. The device of claim 1, wherein the rotatable member comprises a cylindrical member, and wherein the one or more photoelectric elements are arranged substantially contiguous about a longitudinal surface of the cylindrical member.

9. The device of claim 1, wherein the at least one wireless communications module is configured to communicate the at least one indication of the at least one detected measurement of rotational motion using WI-FI communications.

10. The device of claim 1, wherein the at least one photoelectric element secured to the rotatable member is configured to power the at least one movement sensor to detect the at least one measurement of rotational motion based on optical energy received from at least one light emitting diode (LED) external to the rotatable member.

11. A method comprising:
    powering, via at least one photoelectric element secured to a rotatable member, at least one movement sensor associated with a rotatable member to detect at least one measurement of rotational motion of the rotatable member; and
    powering, via the at least one photoelectric element, at least one wireless communications module associated with the rotatable member to communicate at least one indication of the detected at least one measurement from the rotatable member.

12. The method of claim 11, wherein the at least one photoelectric element is secured to an exterior annular surface of the rotatable member.

13. The method of claim 11, wherein the one or more photoelectric elements are arranged substantially contiguous with a circumference of the annular exterior surface of the rotatable member.

14. The method of claim 11, wherein the one or more photoelectric elements are arranged to substantially contiguously to an annular contour of the annular exterior surface of the rotatable member.

15. The method of claim 11, wherein the at least one photoelectric element secured to the rotatable member is configured to power the at least one movement sensor to detect the at least one measurement of rotational motion based on optical energy received from at least one light emitting diode (LED) external to the rotatable member.

16. A device comprising:
   means for powering, via at least one photoelectric element secured to a rotatable member, at least one movement sensor associated with a rotatable member to detect at least one measurement of rotational motion of the rotatable member; and
   means for powering, via the at least one photoelectric element, at least one wireless communications module associated with the rotatable member to communicate at least one indication of the detected at least one measurement from the rotatable member.

17. The device of claim 16, wherein the at least one photoelectric element is secured to an exterior annular surface of the rotatable member.

18. The device of claim 16, wherein the at least one photoelectric element is arranged substantially contiguously about a circumference of the annular exterior surface of the rotatable member.

19. The device of claim 16, wherein the at least one photoelectric element is arranged to be substantially contiguous with an annular contour of the annular exterior surface of the rotatable member.

20. The device of claim 16, wherein the at least one photoelectric element receives optical energy from at least one light emitting diode (LED) external to the rotatable member.

* * * * *